Patented Feb. 19, 1952

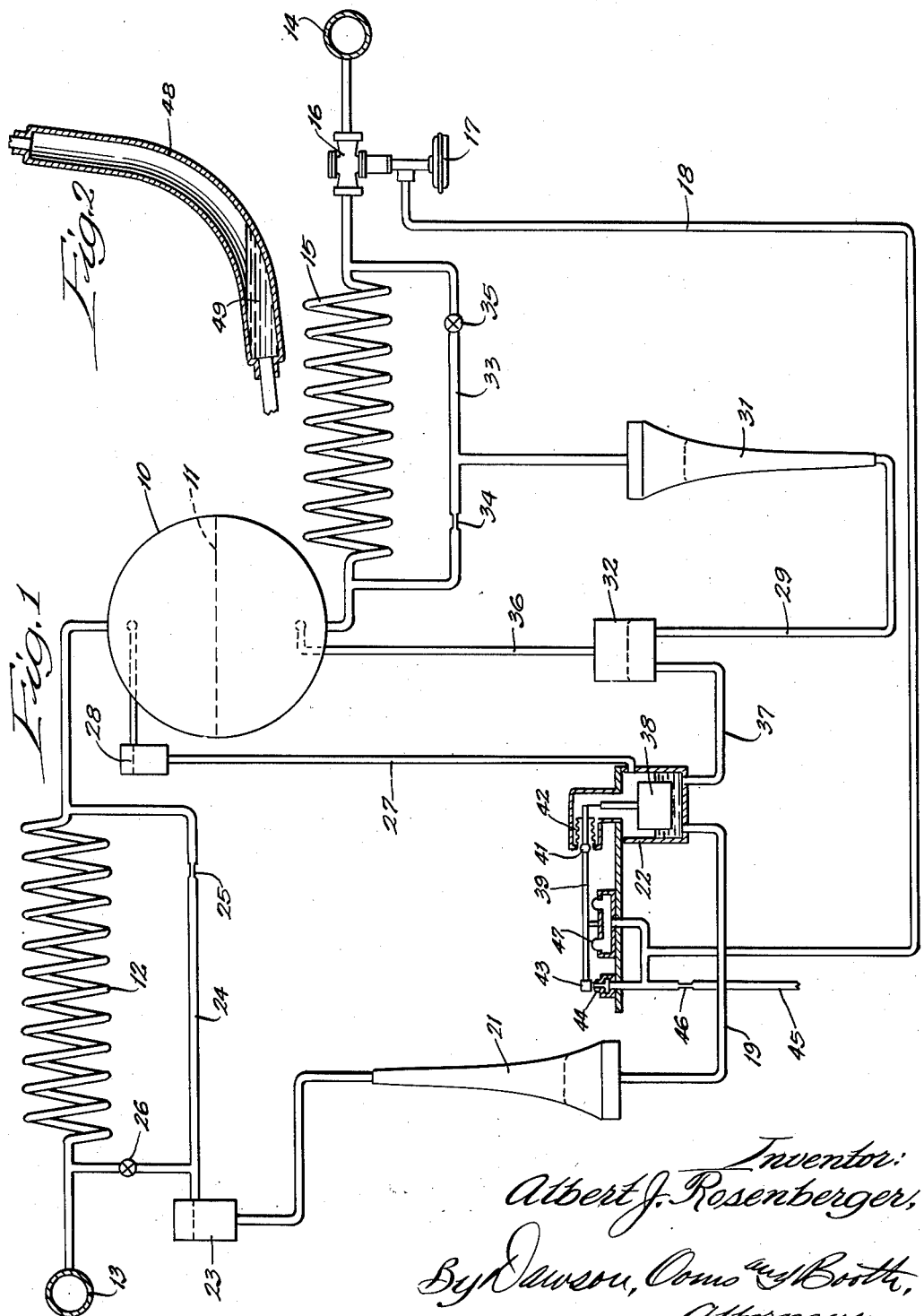

2,586,093

UNITED STATES PATENT OFFICE 2,586,093

APPARATUS FOR PROPORTIONING CONDITIONS

Albert J. Rosenberger, Chicago, Ill., assignor to Republic Flow Meters Company, Chicago, Ill., a corporation of Illinois Application June 13, 1945, Serial No. 599,212

2 Claims. (Cl. 122—451)

This invention relates to apparatus for proportioning conditions and more particularly to apparatus for maintaining conditions such as flows, pressures, temperatures and the like in a predetermined proportional relationship to each other.

One of the objects of the invention is to provide an apparatus for proportioning conditions in which at least one of the conditions is controlled by a single controlling force responsive jointly to functions of the several conditions.

Another object is to provide an apparatus for proportioning conditions in which the relationship between the conditions may be compensated or modified in response to variations in another condition which is related to or affected by the first conditions. Preferably a single control force is modified by all of the conditions to perform a single control operation.

Still another object is to provide apparatus for proportioning conditions in which level changes in several manometer tubes are combined to produce a single resultant level change which is used to affect the control.

Still another object is to provide apparatus for proportioning conditions in which a level change produced by the combination of several manometer tubes may be modified in accordance with a compensating factor.

A specific object is to provide a boiler feed water control in which the feed water supply is controlled jointly in accordance with steam flow, water flow and water level.

The above and other objects and advantages of the invention will be apparent from the following description when read in connection with the accompanying drawings, in which:

Fig. 1 is a diagrammatic view of a boiler feed water control embodying the invention and Fig. 2 is a partial sectional view of a modified form of the shaped chamber.

The system shown in Fig. 1 is designed to maintain the desired water level in a boiler drum indicated at 10, the water level therein being shown by the dotted line 11. It will be understood that the drum 10 forms a part of a conventional steam boiler supplying steam through a superheater 12 to a steam main 13. Water is supplied to the boiler from a supply pipe 14 through an economizer coil 15 under the control of a valve 16. The valve 16 is controlled by a diaphragm or the like 17 in response to pressure supplied through a pipe 18 in such a way that the valve opens in response to a reduction in pressure in the line 18. While the boiler has been shown with both superheater and economizer coils, it will be understood that for the purposes of the present invention these coils function only as restrictions in the steam and water lines respectively.

The rate of steam flow from the boiler is measured by a manometer tube 19 containing mercury or like heavy liquid. One leg of the tube is in the form of a shaped chamber 21 whose cross section varies in accordance with a square root function. The other leg of the tube is in the form of a pot 22 of uniform section. The chamber 21 is connected at its upper end through a constant level chamber 23 to a bypass 24 around the superheater 12. The bypass 24 is restricted as indicated at 25 and has a manually adjustable valve 26 therein. By adjusting the valve 26 any desired portion of the pressure drop across the superheater can be made effective on the chamber 21. The pot 22 is connected by a pipe 27 through a constant level chamber 28 to the upper part of the boiler drum 10 above the water level in the drum. With this construction it will be seen that the level changes in the shaped chamber 21 and the pot 22 will vary in accordance with the square of the flow of steam from the boiler and that due to the effect of the shaped chamber, the level changes in the pot 22 alone will vary in direct proportion to variations in the steam flow.

The supply of water to the boiler is similarly measured by a manometer tube 29, one leg of which is formed by a chamber 31 shaped according to a square root function. The other leg of the tube 29 terminates in a pot 32 of constant section. The chamber 31 is connected to a bypass 33 around the economizer 15, the by-pass having a restriction 34 and a valve 35 therein. With this construction the valve 35 can be adjusted to make the pressure on the chamber 31 any desired portion of the drop across the economizer. The pot 32 is connected through a pipe 36 to the lower part of the boiler drum below the liquid level therein. The pots 22 and 32 are connected by a tube 37 lying entirely below the normal mercury level in the pots.

The valve 16 is controlled in accordance with the level changes in the pot 22. For this purpose a displacement type float 38 is mounted in the pot 22 and is connected to one end of a lever 39 pivoted at 41. The inner end of the lever may be sealed by a flexible bellows 42 in the manner more particularly described and claimed in my Patent No. 2,299,179. The opposite end of the lever 39 carries a valve member 43 which is moved toward and away from a nozzle 44 supplied with air or like actuating fluid through a pipe 45 formed with a restriction 46 therein. The lever is rebalanced by a diaphragm 47 whose lower surface is connected to the pipes 45 between the restriction 46 and nozzle 44. The diaphragm 17 which controls the valve 16 is similarly connected to the pipe 45.

Upon an increase in liquid level in the pot 22, the float 38 will exert an increased upward force to move the valve member 43 toward the nozzle 44. This causes an increase in the pipe 45 below the nozzle increasing the upward force on the diaphragm 47 to an extent sufficient to rebalance the lever. The increased pressure is also transmitted to the diaphragm 17 which operates to move the valve 16 toward its closed position.

In operation of the system, assuming that the steam flow and water flow from and to the boiler are in equilibrium, the system will be balanced with the valve 16 opened to the extent necessary to supply the correct amount of feed water. If the demand for steam should increase causing the steam flow to increase, the differential in pressure between the upper part of the boiler and the chamber 21 will increase causing mercury to rise in the chamber 21. This will produce a corresponding and equal drop in level in the pots 22 and 32 and in the chamber 31. Due to the drop in level in pot 22 the upward force exerted by the float 38 will decrease causing a decrease in pressure beneath the nozzle 44. This decreasing pressure acting on the diaphragm 17 will cause the valve 16 to open thereby increasing the water flow. Increased water flow causes an increase in pressure on the chamber 31 reducing the mercury level therein and producing a corresponding and equal change in level in the pots 32 and 22 and the chamber 21. This increase in level in the pot 22 checks the further tendency to open of the valve 16, and when the water flow is again proportional to the steam flow, the system will again be in equilibrium.

In the event that there has been a change in the water level in the boiler for any cause, the relative pressures between the pots 22 and 32 will be changed to cause a flow of mercury from one pot to the other. It will be noted in the system shown that the pot 22 is always subject to the static pressure in the boiler drum plus the head of liquid standing in the pipe 27 up to the constant level chamber 28. The pot 32, on the other hand, is subject to the static pressure in the boiler plus the liquid head from the water level 11 in the boiler drum above the pot. Thus a reduction in the water level in the boiler will reduce the head on the pot 32 causing mercury to flow from the pot 22 into the pot 32 so that the upward force of the float 38 will be reduced. As explained above this will reduce the pressure applied to the diaphragm 17 so that the valve 16 will be opened further to return the level to the desired value. Thus in the present system the water level is controlled in accordance with the ratio between steam flow and water flow and is compensated by the actual water level existing in the boiler. By adjustment of the valves 26 and 35 the effect of the steam and water flows may be adjusted to make the level control dominate or to make the steam flow-water flow control dominate. In fact by closing these valves the system can be made entirely level responsive.

While the invention has been particularly described in connection with a boiler feed water control, it will be apparent that the same control apparatus and principles could be utilized to maintain a desired proportion between any other conditions and to compensate the proportional control in accordance with factors which are related to or are affected by the conditions. One of the principal advantages of the invention is that a single control force, in the embodiment shown the force exerted by the float 38, is varied in accordance with a combination of several factors and is utilized to affect a control operation controlling one of the factors.

Fig. 2 illustrates a modified form of shaped chamber which could be used in place of the chambers 21 and 31 of Fig. 1. In this construction the shaped chamber consists of a tube 48 of uniform cross section which is bent into a curve approximating a square root curve. The tube may contain a liquid such as mercury indicated at 49 and has pressure connections at its opposite ends. When the tube is turned to the position shown, it corresponds to the chamber 21 in that its volume from the bottom up gradually reduces in accordance with a square root function. By turning the tube so that the lower portion thereof is substantially vertical and becomes more nearly horizontal at its upper end, it would function like the chamber 31 in that its volume would gradually increase from the lower end up in accordance with a square root function. This construction has the advantage of simplicity and cheapness and eliminates a large part of the machining required to make shaped chambers such as 21 and 31.

While one embodiment of the invention has been shown and described in detail, it will be understood that it is illustrative only and is not to be taken as a definition of the scope of the invention, reference being had for this purpose to the appended claims.

What is claimed is:

1. Boiler feedwater control apparatus for a boiler having a restricted feedwater inlet conduit and a restricted steam outlet conduit comprising valved by-passes around the restrictions in the feedwater inlet and steam outlet conduits, a manometer tube having one leg connected to the steam outlet by-pass and its other leg connected to the top of the boiler, a second manometer tube having one leg connected to the feedwater inlet by-pass and its other leg connected to the boiler below the water level therein, a connection between said other legs of the tubes below the liquid levels therein, and means responsive to the liquid level in said other leg of one of the tubes to control the supply of feedwater to the boiler.

2. Boiler feedwater control apparatus for a boiler having a restricted feedwater inlet conduit and a restricted steam outlet conduit comprising valved by-passes around the restrictions in the feedwater inlet and steam outlet conduits, a manometer tube having one leg connected to the steam outlet by-pass and its other leg connected to the top of the boiler, a second manometer tube having one leg connected to the feedwater inlet by-pass and its other leg connected to the boiler below the water level therein, said one leg of the tubes being shaped according to a square root function whereby level changes in the other legs will be directly proportional to the flows of steam and feedwater respectively, a connection between said other legs of the tubes below the liquid levels therein, and means responsive to the liquid level in said other leg of one of the tubes to control the supply of feedwater to the boiler.

ALBERT J. ROSENBERGER.

REFERENCES CITED

The following references are of record in the file of this patent:

UNITED STATES PATENTS

| Number | Name | Date |
| --- | --- | --- |
| 1,607,537 | Hodgson | Nov. 16, 1926 |
| 1,940,828 | Veenschoten | Dec. 26, 1933 |
| 1,962,676 | Albright | June 12, 1934 |
| 2,003,912 | Weaver | June 4, 1935 |
| 2,193,095 | Harrison | Mar. 12, 1940 |
| 2,348,890 | Earle, Jr. | May 16, 1944 |
| 2,354,423 | Rosenberger | July 25, 1944 |